(12) United States Patent
Glance

(10) Patent No.: US 8,182,034 B2
(45) Date of Patent: May 22, 2012

(54) FOLDAWAY CHILD BOOSTER SEAT

(76) Inventor: Patrick M. Glance, Plymouth, MI (US)

( * ) Notice: Subject to any disclaimer, the term of this patent is extended or adjusted under 35 U.S.C. 154(b) by 64 days.

(21) Appl. No.: 12/687,563

(22) Filed: Jan. 14, 2010

(65) Prior Publication Data
US 2010/0176635 A1 Jul. 15, 2010

Related U.S. Application Data

(60) Provisional application No. 61/144,637, filed on Jan. 14, 2009.

(51) Int. Cl.
*A47D 1/10* (2006.01)
*A47D 1/02* (2006.01)

(52) U.S. Cl. ........................ 297/253; 297/16.1

(58) Field of Classification Search ............... 297/250.1, 297/253, 255, 256, 40, 219.12, 16.1, 16.2
See application file for complete search history.

(56) References Cited

U.S. PATENT DOCUMENTS

| | | | |
|---|---|---|---|
| 5,183,311 A | | 2/1993 | Meeker et al. |
| 5,609,389 A | * | 3/1997 | Longoria et al. ............... 297/37 |
| 5,950,261 A | * | 9/1999 | Hay et al. .......................... 5/482 |
| 6,079,772 A | * | 6/2000 | Green .......................... 297/16.1 |
| 6,145,932 A | * | 11/2000 | Hamel-Nyhus et al. ...... 297/465 |
| 6,394,543 B1 | * | 5/2002 | Dunne et al. ............. 297/219.12 |
| 6,692,072 B2 | * | 2/2004 | Nelson et al. ............... 297/250.1 |
| 6,817,663 B1 | * | 11/2004 | Stuart ...................... 297/219.12 |
| D558,990 S | | 1/2008 | Glance |
| 7,374,241 B2 | | 5/2008 | Gold et al. |
| 7,422,276 B2 | * | 9/2008 | Flannery ....................... 297/16.2 |
| 7,857,385 B2 | * | 12/2010 | Zink et al. ...................... 297/256 |
| 2008/0277984 A1 | * | 11/2008 | Carine ........................... 297/253 |
| 2010/0109399 A1 | * | 5/2010 | Rockwell et al. ........ 297/219.12 |

FOREIGN PATENT DOCUMENTS
WO 2005079159 9/2005
* cited by examiner

*Primary Examiner* — Milton Nelson, Jr.
(74) *Attorney, Agent, or Firm* — John A. Waters; Waters & Associates, PLC

(57) ABSTRACT

A portable, collapsible child booster seat for a vehicle comprises a collapsible seat member that removably rests on a vehicle seat with collapsible arm rests extending upwardly from opposite sides of the seat member. The seat member includes an upper seating surface supported on a collapsible scissors frame seat base. The seat base is raisable to a deployed position and collapsible to a storage position. The arm rests comprise horizontal arms pivotably mounted on raisable legs. The arm rests have a deployed position, wherein the legs extend upwardly from the seat base and the arms extend forwardly, and a collapsed position, wherein the legs and arms are in a generally horizontal position adjacent the sides of the seat base. The arm rests and seat base are operably interconnected, such that raising or lowering the arm rests between their deployed and collapsed positions causes deployment and collapse of the seat base.

13 Claims, 8 Drawing Sheets

FOLDAWAY CHILD BOOSTER SEAT

CROSS-REFERENCE TO RELATED APPLICATIONS

This application is based in part on and claims the priority of applicant's Provisional Patent Application No. 61/144,637, filed Jan. 14, 2009, which is incorporated by reference.

STATEMENT REGARDING FEDERALLY SPONSORED RESEARCH OR DEVELOPMENT

Not Applicable.

PARTIES TO A JOINT RESEARCH AGREEMENT

Not Applicable.

REFERENCE TO A SEQUENCE LISTING

Not Applicable.

BACKGROUND OF THE INVENTION

Child safety seats for vehicles include their own safety belts and are generally mandated for children under four years old who weigh less than forty pounds. Child booster seats are used for larger children, typically four to eight year old children who weigh between forty and eighty pounds and are less than about 4 feet 9 inches tall.

Child booster seats raise the position of these children so that the child will be in an effective position to use the vehicle's seat belt system. These seats are sometimes called belt positioning booster seats.

Child booster seats typically include a seat member or seat cushion, a seat back, and seat arms on opposite sides of the seat. Some booster seats employ only a seat member and seat arms and employ the vehicle seat back as a seat back. Booster seats are positioned on the surface of a vehicle seat and may or may not be removably attached to the vehicle seat. One conventional attachment mechanism, called a LATCH connector system, comprises latches at the rear edges of the child seat that releasibly clip onto brackets called "ISOFIX wires" that are positioned at the bight between the seat back and seat cushion of a seat assembly. Seats can be manually clipped into and released from these brackets for mounting and dismounting the seat from the vehicle.

One of the drawbacks with a conventional child booster seat is that the seat cushion may be quite thick, perhaps four inches for a smaller child, and the thick seat together with the protruding arm rest is cumbersome and difficult to store when not in use. The seat is also inconvenient to transport for use on other vehicles, such as when a child is invited to ride in a friend's car or the child's family rents a car while on a trip.

An object of the present invention is to provide a personal, portable child booster seat assembly wherein the seat member and arm rests collapse into a compact and generally flat package that can easily be removed and transported by children and stored in the vehicle, a school locker, a back pack, car pockets, bus sidewalls, or elsewhere, and the collapsed seat assembly occupies a minimum of storage space. This invention provides a convenient solution for a motorist who occasionally transports children or who wishes to transport additional children without endangering the children by leaving them unprotected and without violating child booster seat laws in U.S. states and in Canada.

BRIEF SUMMARY OF THE INVENTION

In accordance with the present invention, a portable, collapsible child booster seat for a vehicle comprises a seat member that removably rests on a vehicle seat and arm rests that extend upwardly from opposite sides of the seat member to an arm supporting position on each side of the seat member. The seat member includes an upper seating surface supported on a collapsible seat base. The seat base is raisable to a deployed position and collapsible to a storage position and is releasibly latchable in the deployed position. The seat member is thinner in its collapsed position than when in the deployed position. The arm rests are raisable to a deployed position, wherein the arm rests extend above the seat member. The arm rests are collapsible to a storage position, wherein the arms are substantially horizontal and lie along the side of the seat member. The seat is releasibly attachable to a vehicle seat by pivotable latches of the invention and is removable for storage in its collapsed condition.

Desirably, the seat member of the child booster seat includes a collapsible frame that supports a raisable seat cushion. The seat frame supports the cushion in an elevated position when deployed and is collapsible upon actuation to lower the seat cushion to a lowered position so as to reduce the vertical thickness of the seat member. Preferably, the seat frame is a collapsible scissors frame.

Preferably, each arm rest includes one or more legs, each having a lower end pivotally attached to the chair base and an upper end pivotally attached to a horizontal arm. The arm rest has a deployed position wherein the legs extend upwardly from the seat frame and the arm extends forwardly above the seat. The arm rest has a collapsed position wherein the legs and arm are in a generally horizontal position adjacent the sides of the seat base.

The seat frame is maintained in a deployed position by a mechanical latch and is collapsible upon releasing the latch. In one aspect of the invention the arm rest and seat frame are operably interconnected, such that deployment and collapse of the arm rest causes deployment and collapse of the seat frame.

These and other features and advantages of the present invention are described below and shown in the appended drawings.

DETAILED DESCRIPTION OF THE INVENTION

Figure 2:
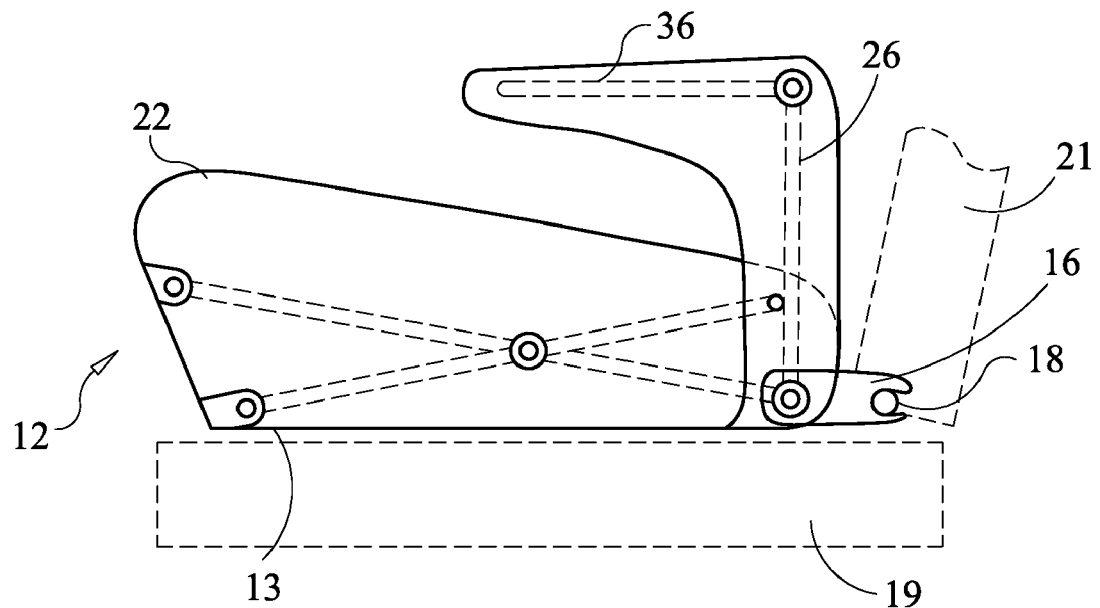
FIG. 2 is a side elevational view of the deployed booster seat of FIG. 1, showing the seat as mounted on a vehicle seat.
Figure 3:
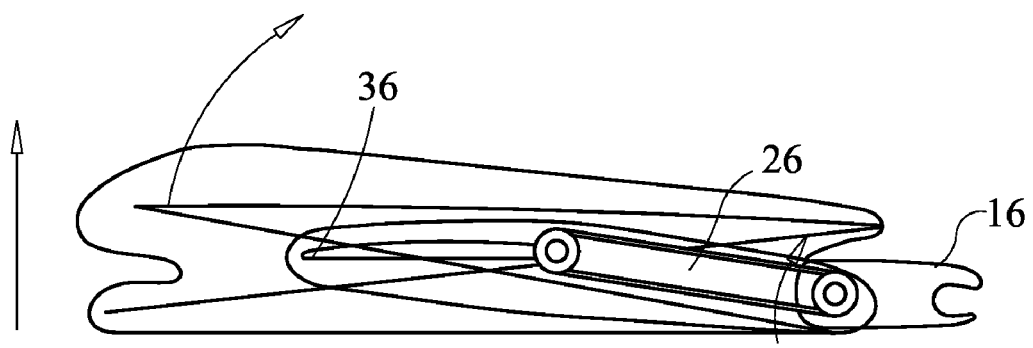
FIG. 3 is a side elevational view of the booster seat of FIG. 2, shown in a folded or collapsed condition.

Booster seat 10 comprises a seat cushion or seat member 12 and arm rests 14 on each side of the seat member. The seat desirably includes releasable latches 16 that extend rearwardly from opposite sides of the seat member. The latches releasibly engage wire rod mounting brackets 18 that are mounted in newer automobile seats at the bight between the back 21 and seat member 19 (FIG. 2). These brackets are often standard equipment for attaching child seats to the automobile seats. Latches on child seats that engage these wires are known. These latches are called LATCH connectors and the brackets are called ISOFIX wires 18.

Figure 1:
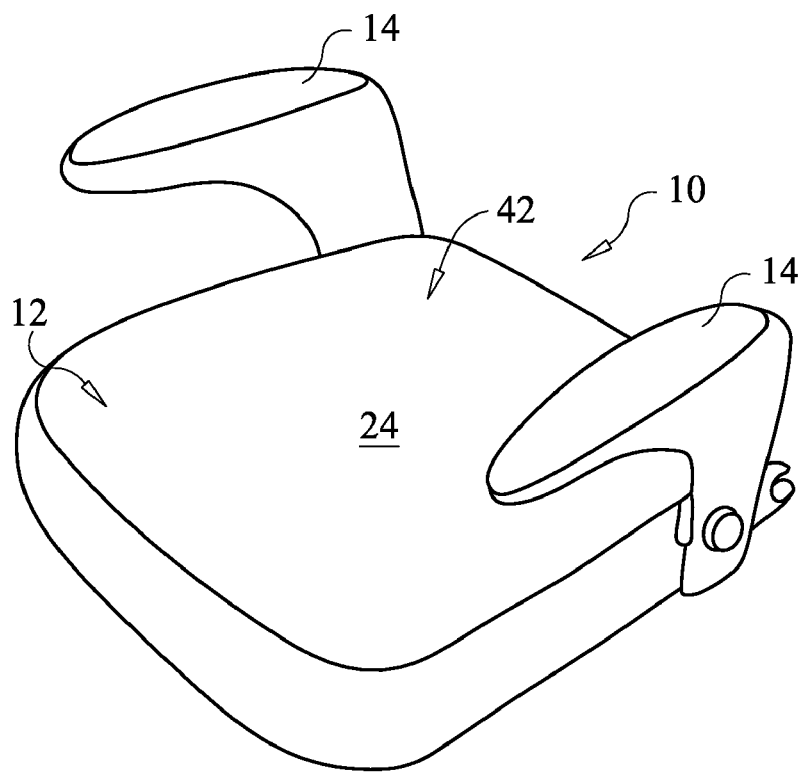
FIG. 1 is a perspective view of a first embodiment of a collapsible child booster seat of the present invention shown in a deployed position.

Seat member 12, shown in its deployed condition in FIGS. 1 and 2, comprises a bottom 13, a collapsible internal frame 20 (FIGS. 5-8) extending upwardly from the bottom, surface padding 22 mounted on the top 23 of the frame, and a cover 24 formed of fabric, plastic sheeting or other surface material covering the exterior of the seat cushion. Arm rests 14 serve not only as arm rests for an occupant but they also serve as a belt guide for proper positioning of a seat belt on the occupant. When deployed, the booster seat functions in the same manner as a conventional child booster seat. A feature of the present invention is when the seat is not in use the seat can be collapsed into a compact, low profile, substantially flat package for removal and storage. This is accomplished by means of a collapsible frame 20 of the seat member as well as by a folding mechanism incorporated into the arm rest.

The internal frame 20 of seat member 12 is constructed so as to be collapsible to a folded or collapsed storage position, as shown in FIGS. 3, 4, 7, and 8, in order to flatten the profile of the seat for storage. While other seat constructions could be employed for providing a collapsible seat member, or other mechanical mechanisms, in the illustrated embodiment, the seat frame comprises a scissors type of mechanism that raises and lowers the upper surface 42 of the seat member. The scissors member comprises a pair of U shaped tubular frame members 35 and 37 pivotally connected together by pivot joints 39 at a mid point of side legs 41 and 43. As shown in FIGS. 3-8, the scissors mechanism can be extended or collapsed in order to raise the seat to its deployed position or collapse the seat to its storage position.

As shown in FIGS. 2, 3, and 5-8, each arm rest 14 comprises a leg 26 pivotally attached at a lower end 27 to seat frame 20 at a rear edge of the seat for rotation about a transverse pivotal axis. Leg 26 can pivot between a generally upwardly extending deployed position, shown in FIGS. 2 and 5, and a generally horizontal collapsed or storage position shown in FIGS. 3 and 7.

Figure 4:
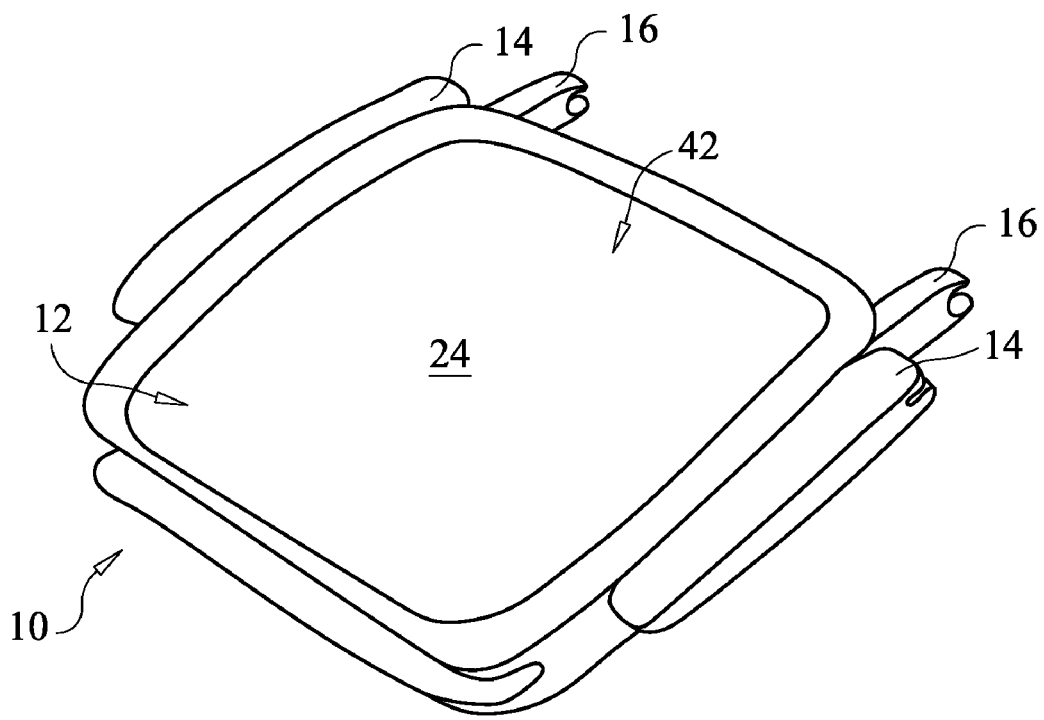
FIG. 4 is a perspective view of the vehicle seat of FIG. 3, shown in a folded or collapsed condition.
Figure 5:
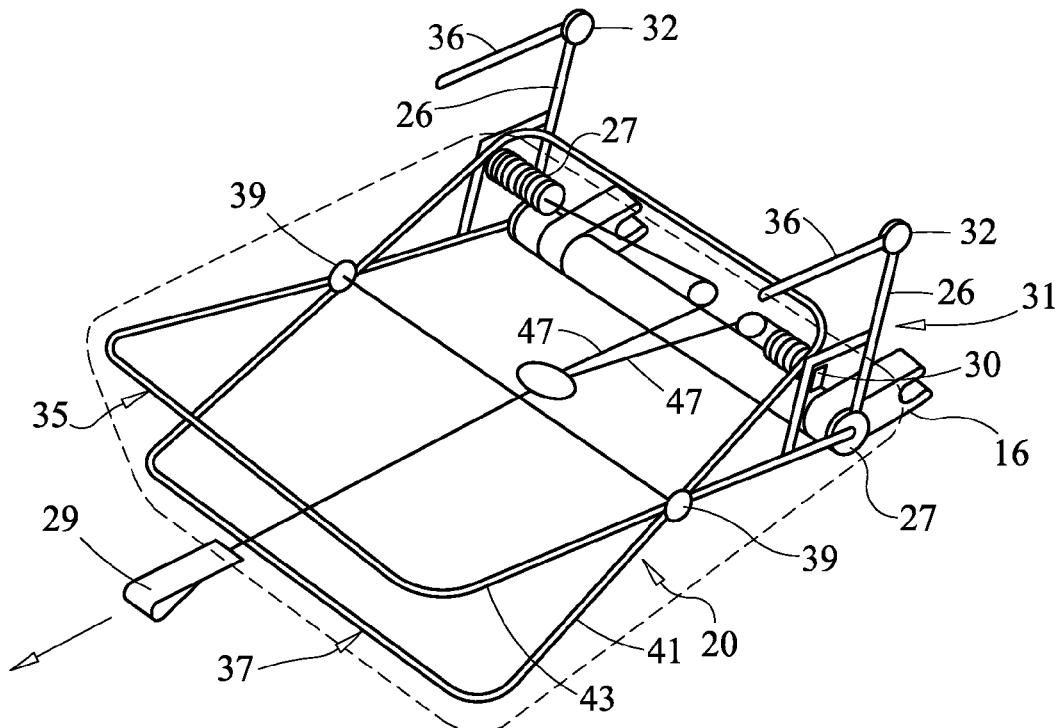
FIG. 5 is a perspective view showing one embodiment of a collapsible frame for the seat cushion of the present invention, shown in a deployed position.
Figure 6:
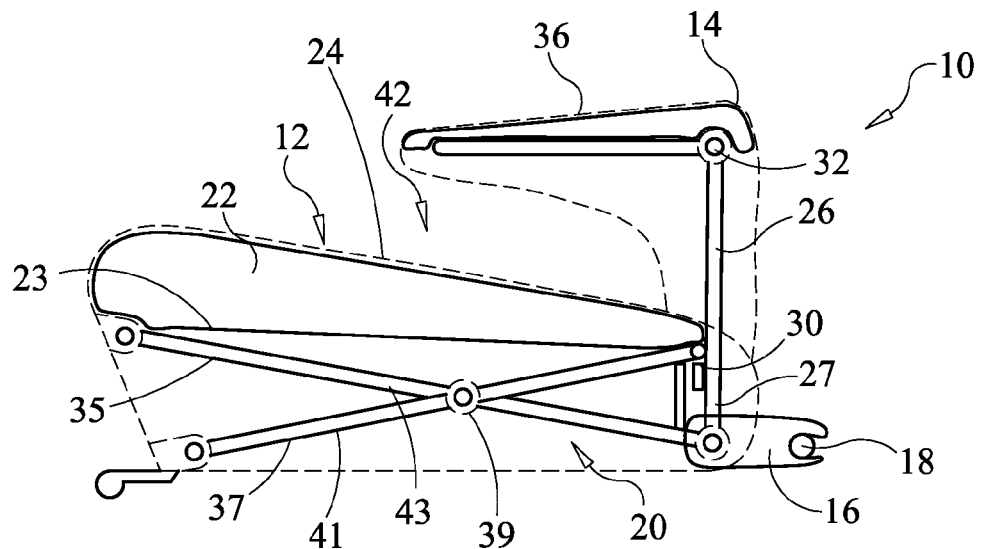
FIG. 6 is a side elevational view of the collapsible seat frame of FIG. 5.
Figure 7:
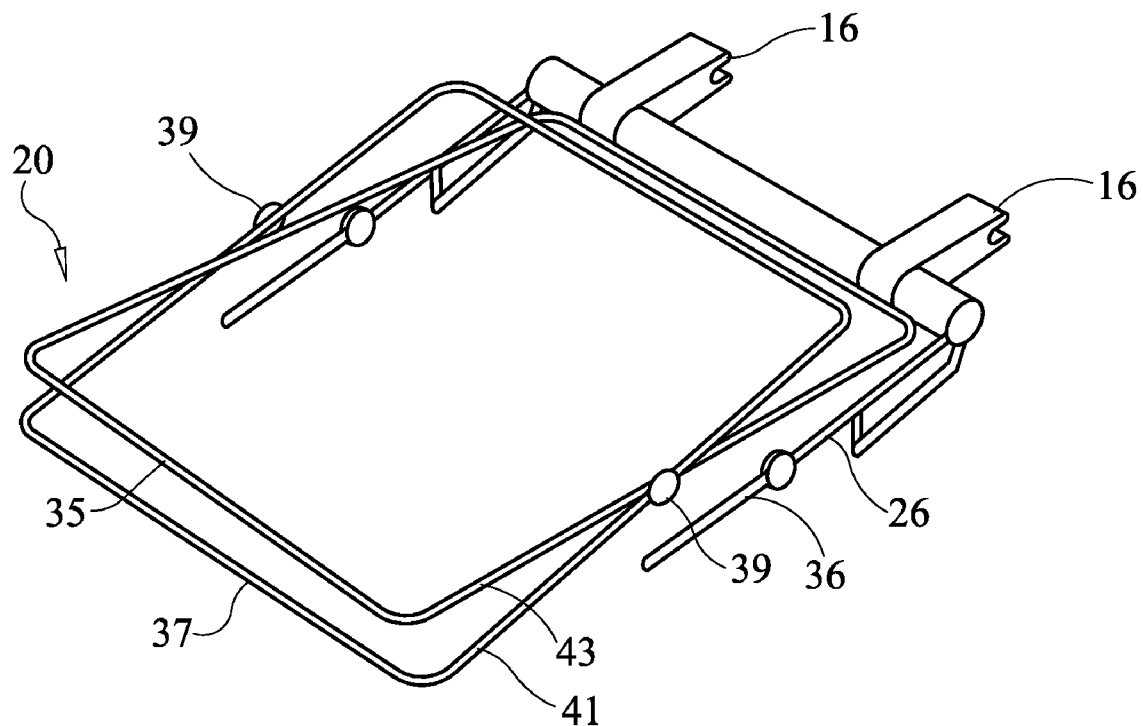
FIG. 7 is a perspective view of the seat frame of FIG. 5, shown in a collapsed condition.
Figure 8:
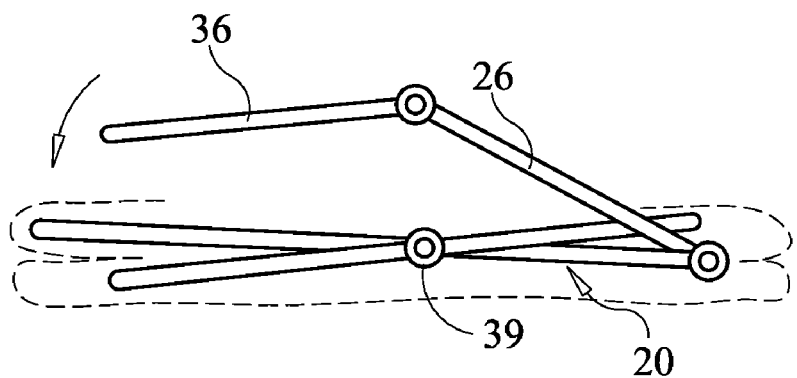
FIG. 8 is a side elevational view of the seat frame of FIG. 7.

An upper end 32 of leg 26 is attached to a horizontal arm 36 that extends forwardly from an upper end of leg 26. Arm 36 is pivotally attached to leg 26 such that the arm is in a raised horizontal position when deployed, as shown in FIGS. 2, 5, and 6, and is in a lowered horizontal position when a seat is collapsed in a storage position, as shown in FIGS. 2, 4, and 7. Arm 36 can be held in this deployed horizontal position by a conventional stop mechanism that prevents the arm from pivoting downwardly when the leg is in its upright or deployed position.

Conventional latches 30 hold scissors frame members 35 and 37 in their deployed positions until manually released by a pair of release cables 47 operated by a loop handle 29 at the front of the frame. Upon releasing latches 30, the scissors frame can be pivoted downwardly to a generally horizontal storage position as shown in FIGS. 3, 4, 7, and 8.

Arm rests 14 also are movable between deployed and storage positions. Such movement may be independent of the deployment and collapse of the seat member or, desirably, the arms may be connected by a mechanical interconnection 31 to the seat frame, such that when the seat frame is collapsed, the arm mechanism is automatically collapsed. At the same time, the mechanical interconnection 31 may be stop members on the frame that prevent the legs of the arm rest from folding downwardly when the scissors frame is extended, with the projections permitting the armrest to pivot downwardly when the frame is collapsed.

When the seat has been folded to the positions shown in FIGS. 3, 4, 7 and 8, the seat latches 16 holding the seat in the vehicle are released and the seat is removed from the vehicle. Since the seat is in a flat, compact condition, it can easily be carried by the child or stored in the trunk of the vehicle or possibly under a seat or other location. The folded seat presents a flat, compact package that is easy to store and transport. Even if the seat remains in position on the seat base, the folded seat can still be used for storage of packages or the like on top of the folded seat.

Figure 9:
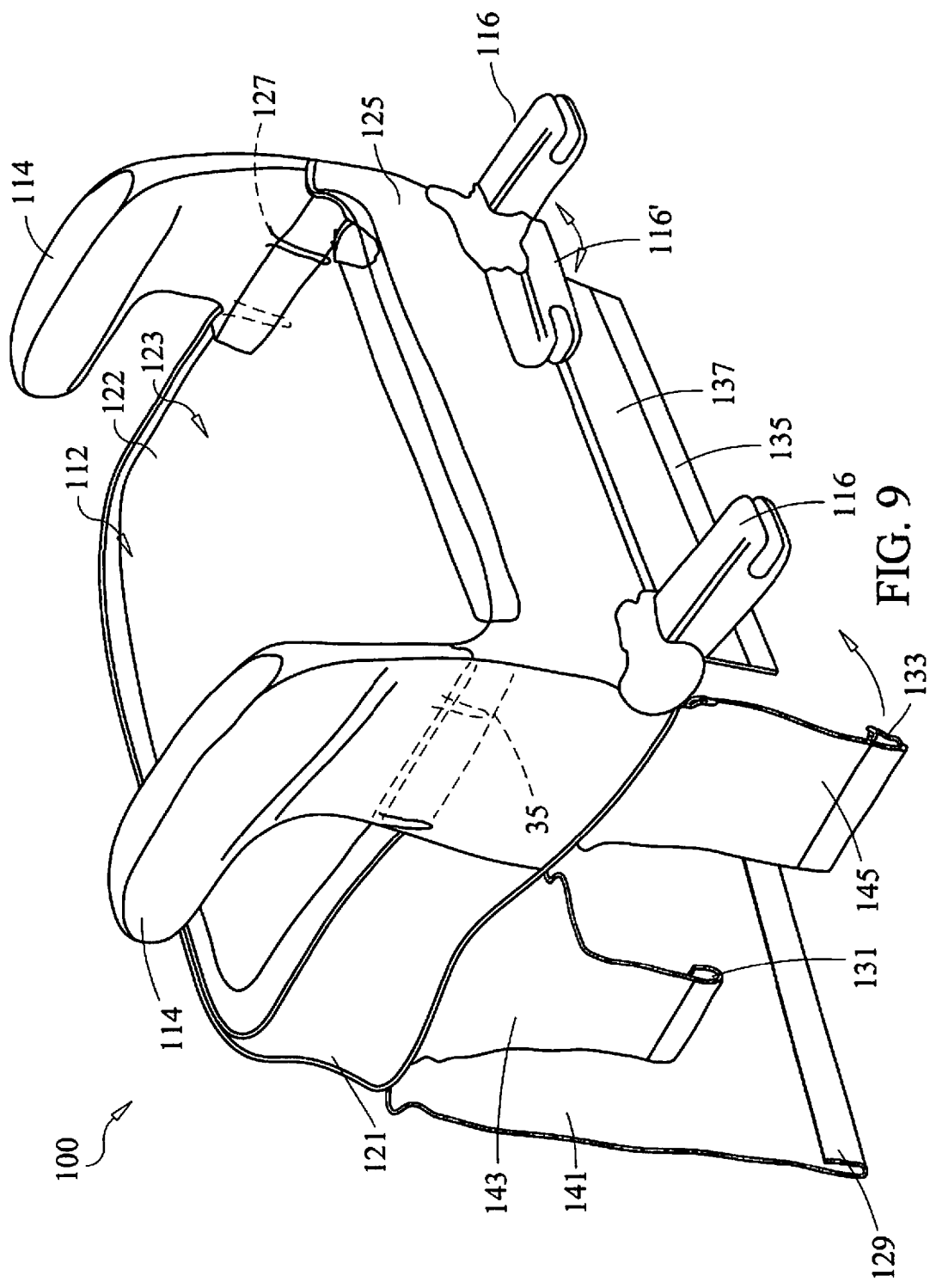
FIG. 9 is a perspective view of a second embodiment of a child booster seat of the present invention, shown in a deployed position.
Figure 11:
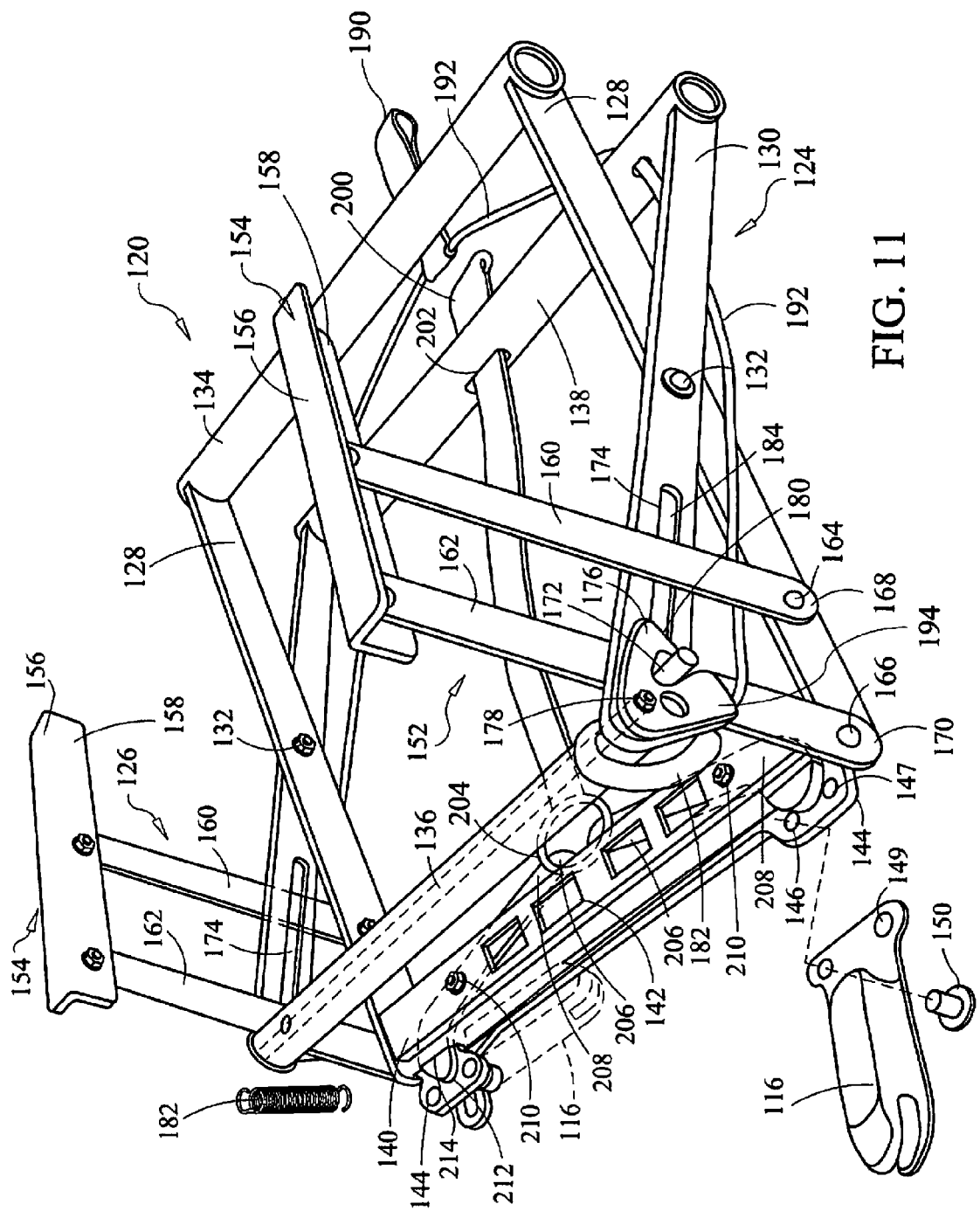
FIG. 11 is a perspective view of the collapsible frame of the second embodiment of the present invention, shown in a deployed position.
Figure 12:
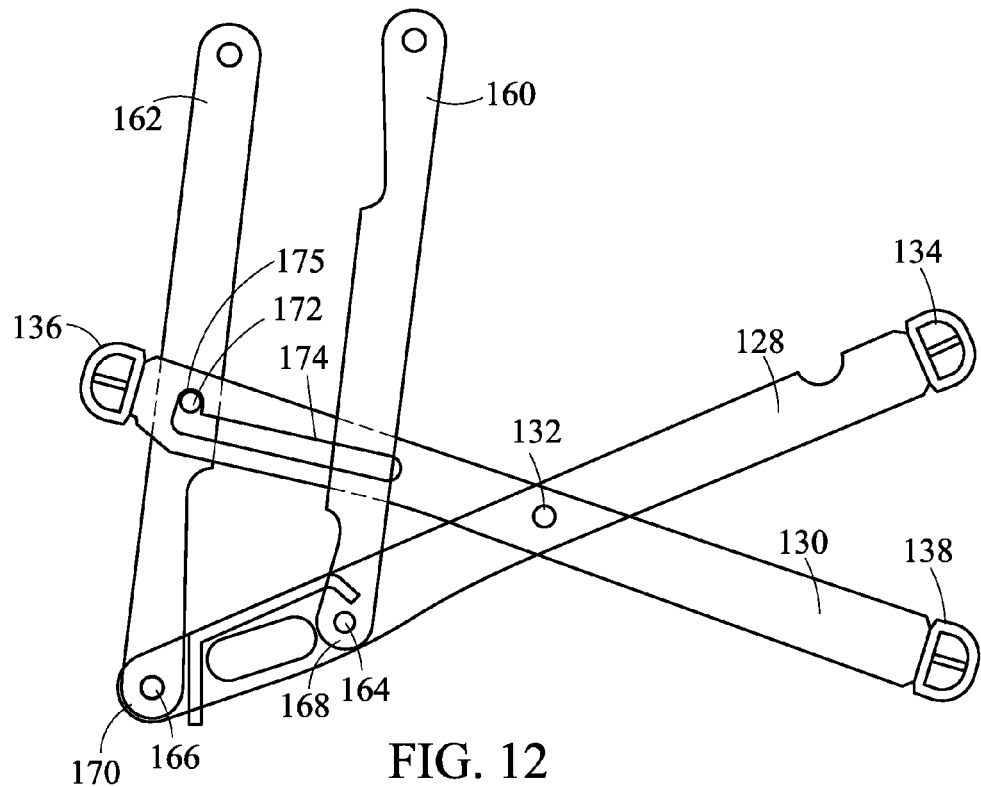
FIG. 12 is a side elevational view of the frame of FIG. 11 shown in a deployed position.
Figure 13:
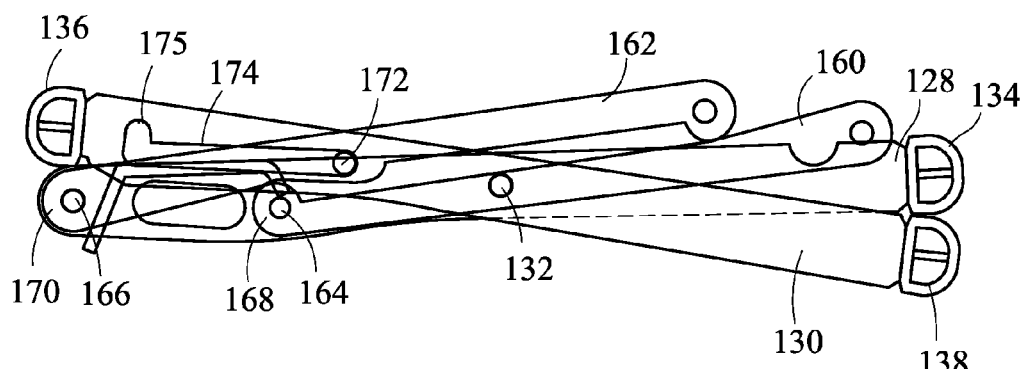
FIG. 13 is a side elevational view of the frame of FIG. 11, shown in a collapsed position.

A second embodiment 100 of a booster seat assembly constructed in accordance with the present invention comprises seat member 112 and arm rests 114 on opposite sides of the seat member 112. Releasable seat latch connectors 116 are pivotally mounted at the rear lower edge of the seat and are pivotable inwardly to the position shown by connector 116' in FIG. 9. These connectors can be substantially the same as the latches 16 in the previous embodiment, but are pivotally mounted to the seat frame. A collapsible frame 120 (shown in FIG. 11-13) supports the seat member and arm rest.

Seat member 112 includes surface padding 122 on the top 123 of frame 120. A seat cover 121 that fits over the seat includes a rear portion 125 that is formed of an elastic material, such as "spandex" or the like, in order to permit the seat to be folded downwardly, with the arms folded forwardly. The seat cover includes pocket folds 127 on the inner lower side of the arm rest in order to permit the arm rest to fold forwardly. The seat cover 121 includes front portion 141 and side portions 143 and 145 on each side of the lower edge of the seat cover that permit the seat cover to be wrapped around the frame and attached securely in position. Velcro (hook and loop) strips 129, 131 and 133 are attachable to the under side of the seat to hold the seat cover in position on the seat. A Velcro strip 135 on a rear flap 137 attaches with Velcro strip 129 to hold the front and rear sides of the seat cover in position. By attaching the seat covers to the seat frame with flaps and Velcro fasteners, the seat cover can be removed for cleaning and replacement as necessary.

Figure 10:
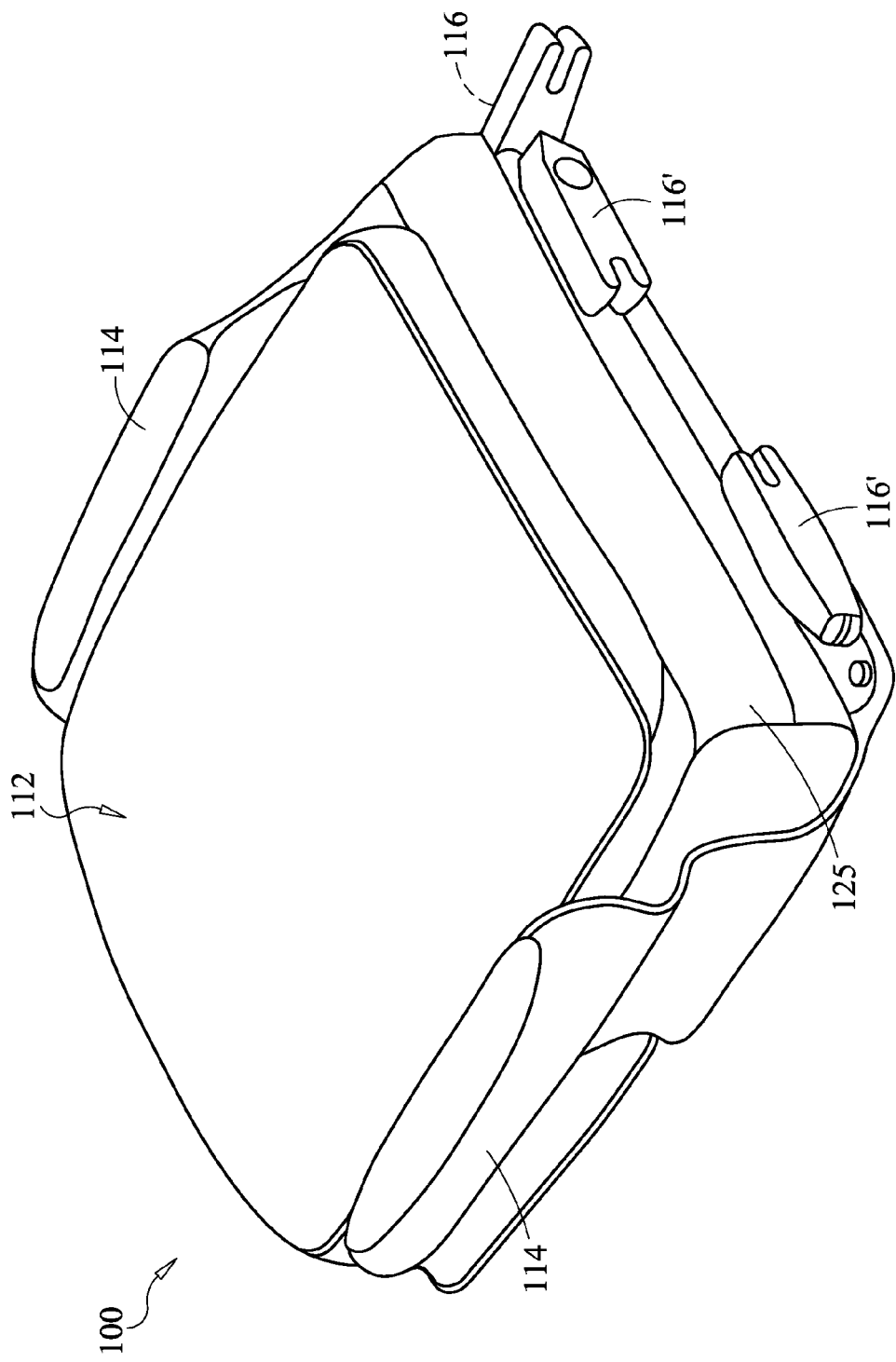
FIG. 10 is a perspective view of the child booster seat of FIG. 9, shown in a folded or collapsed condition.

The seat assembly 100 is shown in a collapsed or storage position in FIG. 10, with seat member 112 collapsed and arm rests 114 collapsed or folded downwardly so they in effect lie in the same plane as the collapsed seat member.

Seat frame 120 comprises a collapsible scissors frame 124 and a foldable arm rest frame 126 operably interconnected with the scissors frame. The scissors frame 124 includes a pair of arms or side members 128 and 130 connected at their midpoints by connector 132 so as to be pivotal around the axis of connector 132 to raise and lower the frame from a folded to a deployed position (shown in FIG. 11). Cross members 134, 136 and 138 connect the distal ends of side members 128 and 130 at the front and upper rear of the frame. The lower rear ends of side members 128 are interconnected by a channel member 140. Channel member 140 has openings 142 therein that permit internal access to the channel. Flanges 144, which have openings 146 and detents 147 therein, extend rearwardly from opposite ends of channel member 140. Openings 146 permit the attachment of Isofix mini-connector latches 116 to the flanges by means of fasteners 150 such as rivets. By attachment of the connector latch by means of a single rivet in one of the holes, the latches can be rotated inwardly to a storage position in the manner shown by latch 116'. Detents 147 in the flange engage recesses 149 in the connector latches to releasibly hold the latch in is deployed position.

Arm rest mechanisms 114 are mounted on the opposite sides of the folding scissors frame 124 and are connected such that the folding arms and folding scissors frame collapse and deploy together as a unit. The frame 126 of arm rest mechanism 114 includes an arm rest 154 having a generally horizontal top 156 and a vertically extending inner flange 158. A pair of arm rest vertical supports 160 and 162 extend upwardly from pivotal attachments 164 and 166 at lower ends 168 and 170 thereof, whereby the vertical supports are pivotally attached to the lower rear portion of scissors arms 128. Vertical supports 160 and 162 are parallel, with vertical support 162 being positioned at the rear end of arm rest 154 and vertical support 160 being positioned at approximately the mid point of arm rest 154. The arm rest and vertical supports and scissors member 128 thus form an approximate parallelogram so that the arm rests remain roughly horizontal as they are raised and lowered.

Travelling stop rods 172 extend outwardly from the sides of vertical supports 162. Stop rods 172 ride in longitudinal slots 174 formed in scissors arms 128 and slide along the slots as the scissors arms are collapsed and deployed. Slots 174 have offset notches 175 at outer ends. These fit on stop rods 172 and urge the frame to remain in a deployed position at least as long as cross member 136 is urged downwardly.

Latches 176 are pivotally mounted on pins 178 at the ends of arms 128, with engagement teeth 180 fitting over stop rods 172 when the latches are engaged. Spring 182 urges the latch to a closed position where it is locked over stop rod 172. A cam surface 184 on the front surface of tooth 180 cams the latch to an open position so that teeth 180 open and then fit over stop rods 172 when the stop rods are slid rearwardly in slots 174 as the arms are raised.

In operation, when the frame is in its collapsed position as shown in FIG. 10, arm rests 154 lie along side of collapsed frame members 128 and 130. When the arms are pulled upwardly to the position shown in FIG. 11, stop rods 172 slide rearwardly in slots 174 until they engage notches 175 and latches 176, at which time, teeth 180 are cammed over the stop rods 172 and then held in position on the stop rod by springs 182. Until the latch is released, the frame is thus latched in its deployed position and the arm rests are in their deployed position.

The frame can be collapsed by means of pull strap 190 that engages a pull cord 192, which is connected at distal ends to a lower rear edge 194 of latch 176. When pull strap 190 is pulled forwardly, pull cord 192 pivots both latches counter-clockwise to an open position, wherein teeth 180 are pivoted out of engagement with stop rods 172. At that point, the arms can be pivoted downward into a folding position, and this action causes stop rods 172 to fold the frames to their folded or collapsed positions. Thus, whenever the arms are raised, the frame is deployed and whenever the arms are collapsed, the frame is collapsed.

The present invention also includes a mechanism for releasing the seat connectors (sometimes called mini-connectors) that are used to hold the seat frame to the wire connectors at the lower rear edge of the vehicle seat. A pull strap 200 having a front end that extends through a slot 202 in lower front cross bar 138 extends rearwardly to a ring 204, which is attached to the ends 206 of pivoting release levers 208 mounted on the underside of channel members 140. Release levers 208 are pivotally mounted on pins 210 and have noses 212 that extend through slots 214 in channel member 140. Noses 212 pivot rearwardly when pull strap 200 is pulled and engage conventional release buttons on the connector latches 116. The release buttons disengage the latches from the ISO-FIX wire connectors. After the booster seat is removed, the latches can be rotated into their closed positions for storage, as shown by numeral 116' in FIG. 11.

While two desirable types of folding seat frames and folding arm mechanisms are shown in the present application, it is contemplated that other types of foldable or collapsible seat bases can be employed in the present invention. Also, while the means for collapsing the seat base is shown as a mechanical linkage in the illustrated embodiment, it is contemplated that other mechanisms could be employed, such as hydraulic, pneumatic, or electrical.

It should be understood that the foregoing is merely exemplary of the preferred practice of the present invention and that changes and modifications may be made from the arrangements and details of construction of the embodiments disclosed herein without departing from the spirit and scope of the present invention, as defined in the attached claims.

What is claimed is:

1. A portable, collapsible vehicle booster seat for a child wherein the booster seat comprises a seat member that is removably mounted on a vehicle seat and an arm rest mechanism that includes arm rests extending upwardly from opposite sides of the seat member to an arm supporting position on each side of the seat member, each arm rest including an arm, the seat member including an upper seating surface supported on a collapsible seat base, the seat base being raisable to a deployed position and collapsible to a storage position and releasibly latchable in the deployed position, the seat member being thinner in its collapsed position than when in the deployed position, the arm rest mechanism being raisable to a deployed position wherein the arm rests extend above the seat member, the arm rests being collapsible to a storage position wherein the arms are substantially horizontal and lie along the side of the seat member, the seat being releasibly attachable to a vehicle seat and being removable for storage in its collapsed condition, each arm rest including a leg having a lower end pivotally attached to the seat base and an upper end pivotally attached to the arm, the arm rest having a deployed position wherein the leg extends upwardly from the seat and the arm extends forwardly above the seat, the arm rest having a collapsed position wherein the leg and arm are in a generally horizontal position adjacent the sides of the seat base for storage or transportation purposes.

2. A portable, collapsible vehicle booster seat according to claim 1, wherein the seat member includes a collapsible seat frame that supports a raisable seat cushion, the seat frame supporting the cushion in an elevated position when deployed and being collapsible upon actuation to lower the seat cushion to a lowered position so as to reduce the vertical thickness of the seat member.

3. A portable, collapsible vehicle booster seat according to claim 1 wherein the seat member comprises a seat cushion supported by a collapsible seat frame, the seat frame being maintained in a deployed position by a mechanical latch and being collapsible upon releasing the latch.

4. A portable, collapsible vehicle booster seat as in claim 1 wherein the seat and arm rests are covered with a removable flexible sheet material, the sheet material being stretchable sufficiently to permit the seat to be moved between its collapsed and deployed positions.

5. A portable, collapsible vehicle booster seat as in claim 4 wherein the sheet material includes an upper portion that fits over the seat and arm rests and a lower portion that includes flaps that fit under the seat and are held in place on the seat by hook and loop fasteners.

6. A portable, collapsible vehicle booster seat as in claim 4 wherein the sheet material covers both the seat and arm rests and has loose folds that permit the arms to fold downwardly and upwardly between collapsed and deployed positions without tearing the sheet material.

7. A portable, collapsible vehicle booster seat for a child wherein the booster seat comprises a seat member that is removably mounted on a vehicle seat and an arm rest mechanism that includes arm rests extending upwardly from opposite sides of the seat member to an arm supporting position on each side of the seat member, each arm rest including an arm, the seat member including an upper seating surface supported on a collapsible seat base, the seat base comprising a collapsible scissors frame, the seat base being raisable to a deployed position and collapsible to a storage position and releasably latchable in the deployed position, the seat member being thinner in its collapsed position than when in the deployed position, the arm rest mechanism being raisable to a deployed position wherein the arm rests extend above the seat member, the arm rests being collapsible to a storage position wherein the arms are substantially horizontal and lie along the side of the seat member, the seat being releasably attachable to a vehicle seat and being removable for storage in its collapsed condition, the seat member and arm rest mechanism are operably interconnected, such that raising the arm rest to its deployed position raises the seat member to its deployed position, and lowering the arm rest to its storage position lowers the seat member to its storage position.

8. A portable, collapsible vehicle booster seat as in claim 7 wherein each arm rest comprises a pair of spaced and generally parallel support members, the support members being pivotally mounted at upper ends to the arm and being pivotally mounted at lower ends to the seat base.

9. A portable, collapsible vehicle booster seat as in claim 7 wherein the seat and arm rests are covered with a removable flexible sheet material, the sheet material being stretchable sufficiently to permit the seat to be moved between its collapsed and deployed positions.

10. A portable, collapsible vehicle booster seat as in claim 9 wherein the sheet material includes an upper portion that fits over the seat and arm rests and a lower portion that includes flaps that fit under the seat and are held in place on the seat by hook and loop fasteners.

11. A portable, collapsible vehicle booster seat as in claim 9 wherein the sheet material covers both the seat and arm rests and has loose folds that permit the arms to fold downwardly and upwardly between collapsed and deployed positions without tearing the sheet material.

12. A portable, collapsible vehicle booster seat for a child wherein the booster seat comprises a seat member that is removably mounted on a vehicle seat and an arm rest mechanism that includes arm rests extending upwardly from opposite sides of the seat member to an arm supporting position on each side of the seat member, each arm rest including an arm, the seat member including an upper seating surface supported on a collapsible seat base, the seat base being raisable to a deployed position and collapsible to a storage position and releasably latchable in the deployed position, the seat member being thinner in its collapsed position than when in the deployed position, the arm rest mechanism being raisable to a deployed position wherein the arm rests extend above the seat member, the arm rests being collapsible to a storage position wherein the arms are substantially horizontal and lie along the side of the seat member, the seat being releasably attachable to a vehicle seat and being removable for storage in its collapsed condition, the booster seat being releasably attachable to a vehicle seat by means of releasable latch connectors pivotally mounted on a rear edge of the booster seat, each latch connector having a deployed position wherein the latch connector is pivoted outwardly so as to extend rearwardly from the back of the seat, the latch connector including a releasable latch element that engages a mounting bracket mounted at the lower rear portion of the seat, the connector being pivotal between a deployed position, wherein the connector extends rearwardly from the booster seat in position to engage the seat mounting bracket, and a collapsed position, wherein the connector is folded inwardly for storage adjacent the rear side of the booster seat.

13. A portable, collapsible vehicle booster seat as in claim 12 and further including a release mechanism for releasing the booster seat latch connector from the vehicle seat, the release mechanism including pivoting release levers mounted adjacent pivoting latch connectors, the release levers being movable between released and actuated positions by a movable actuating member that extends from the release levers to a gripping surface at the front side of the booster seat, the release levers engaging and releasing the seat connectors when actuated, such that the booster seat can be removed.

\* \* \* \* \*